Dec. 26, 1939.    O. J. DAIGLE    2,185,051
AUTOMATIC BED LIGHT
Filed March 14, 1938    2 Sheets-Sheet 2
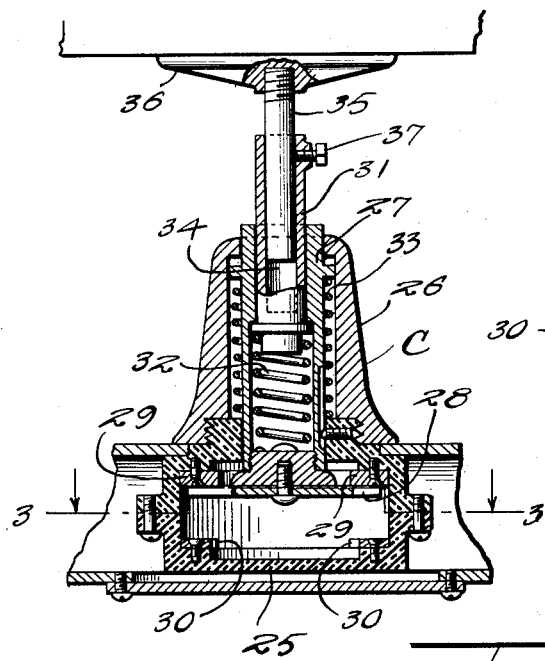
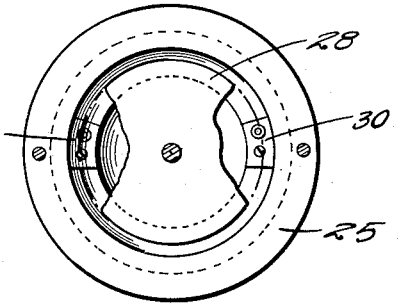
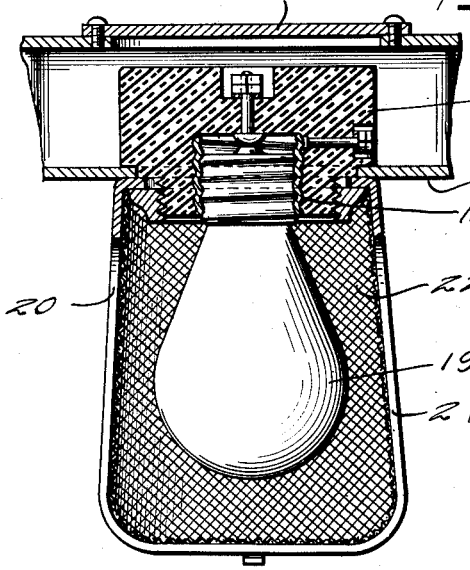
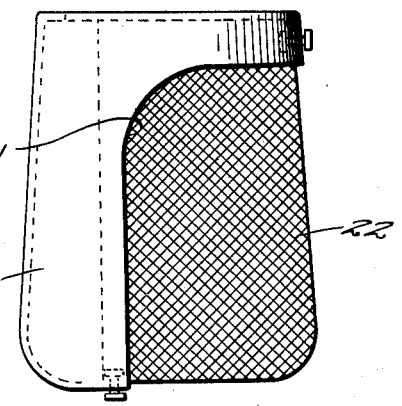
O. J. Daigle
INVENTOR
BY Victor J. Evans & Co.
ATTORNEYS Patented Dec. 26, 1939

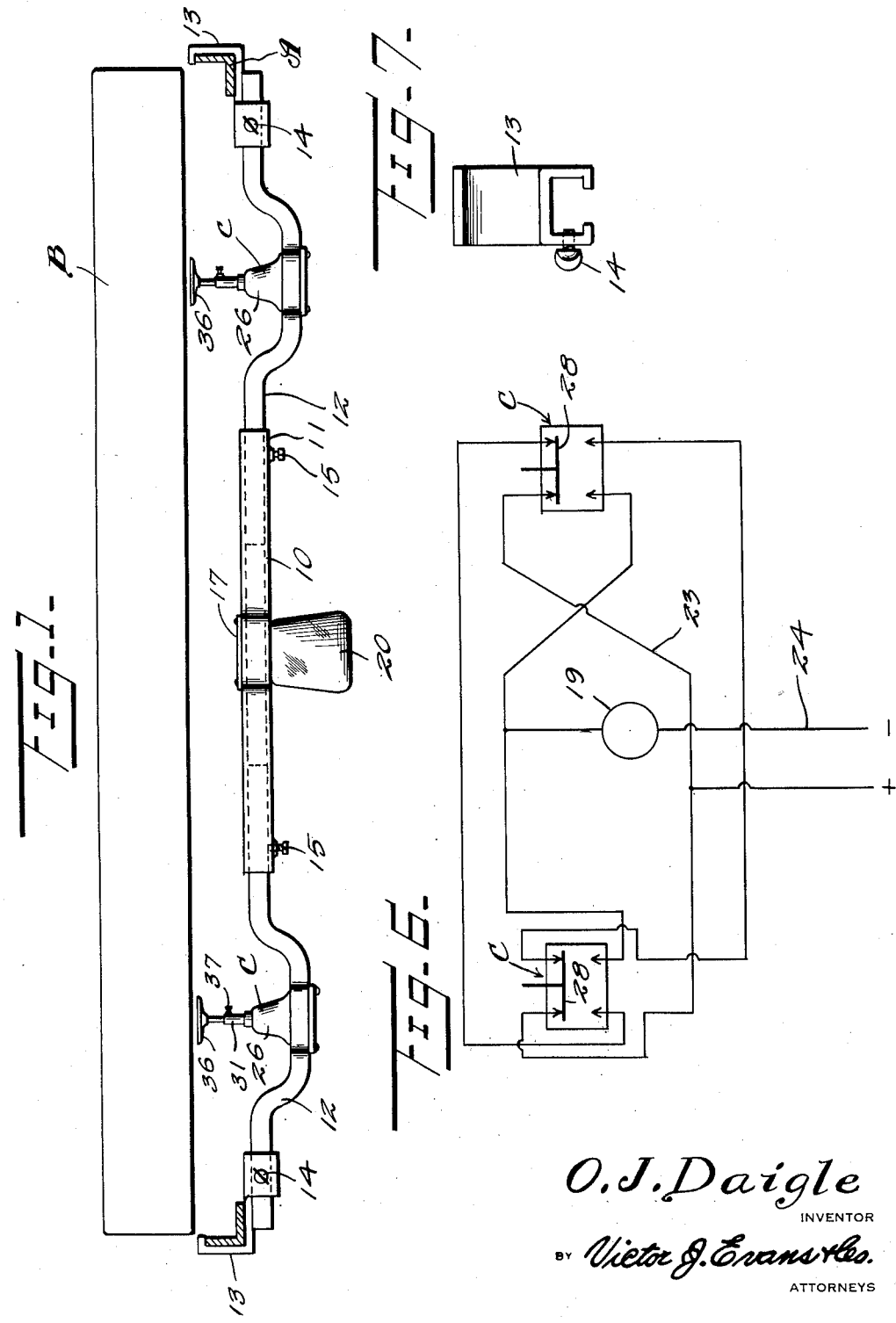

2,185,051

UNITED STATES PATENT OFFICE 2,185,051

AUTOMATIC BED LIGHT

Oscar J. Daigle, New Orleans, La.

Application March 14, 1938, Serial No. 195,898

4 Claims. (Cl. 240—4)

The invention relates to an electric light fixture and more especially to an automatic emergency bed light.

The primary object of the invention is the provision of a light of this character, wherein the same is arranged beneath a bed so that on part occupancy thereof the light will be automatically controlled for illumination or lighting and upon full occupancy of such bed the light will be extinguished automatically thus relieving manual control of such light and when the bed is completely unoccupied the light remains extinguished, the light being for the purpose of relieving occupants of searching for a conventional room light switch in the dark, especially when one of the occupants through emergency is required to get out of the bed, the light being extinguished when the bed is unoccupied and fully occupied, respectively.

Another object of the invention is the provision of an electric light of this character, wherein the same is constructed and associated with switches, these being operated through full and partial occupancy of a bed, the latter being of the double bed type, although the said light is susceptible of service with twin beds and when either are completely unoccupied, the light remains extinguished and when one of the twin beds is occupied and the double bed partially occupied, the light will go on or illuminate, then by the occupancy of the other twin bed and complete occupancy of the double bed, the light becomes extinguished, the light being suspended beneath the bed giving the required shaded illumination when lighted for emergency purposes only.

Another object of the invention is the provision of a light of this character, wherein the supporting of the same and its fitting with the bed is novel so that the light will be automatically controlled in the use of the bed thereby eliminating the turning on and off of the light by a person through manual control of the same as well as the lighting of a conventional room light.

A still further object of the invention is the provision of a light of this character, which is simple in its construction, thoroughly reliable and efficient in operation, readily and easily applied to a bed and removed therefrom, automatically operative and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary vertical transverse sectional view through a bed of the double type showing in elevation an associated mattress with the light constructed in accordance with the invention applied and the parts in normal position and the light extinguished.

Figure 2 is an enlarged fragmentary vertical sectional view through one of the switches in association with the light.

Figure 3 is a sectional view on the line 3—3 of Figure 2 looking in the direction of the arrows.

Figure 4 is a vertical sectional view through the light socket, the lamp bulb being fitted thereto with its shade in section.

Figure 5 is a side elevation of the shade.

Figure 6 is a diagrammatic plan view of the circuit layout for the light, the switches included therein being in normal position when the bed is unoccupied.

Figure 7 is an elevation of one of the hanger hooks for the light fixture.

Similar reference characters indicate corresponding parts throughout the several views in the drawings.

Referring to the drawings in detail, A designates generally portions of the longitudinal side rails of a bedstead of the double type, these being angle irons as is conventional, while B denotes a mattress supported by springs (not shown) when used in connection with the bedstead and such elements or parts are merely shown to illustrate the application of the light constituting the present invention and hereinafter fully described.

The light device constituting the present invention comprises a hanger fixture for fastening to a bedstead, particularly to the side rails A thereof, and involves a tubular center section 10 effecting socketed end portions 11 in which are telescopically fitted adjustable outer sections 12, which at their outer ends have adjustably engaged thereon hanger hooks 13 engageable with the rails A of the bedstead for the hanging of the fixture crosswise of the latter and beneath the mattress B when upon the springs for supporting the same. The hanger hooks carry set screws 14 adjustably connecting the same with the outer sections 12 while the intermediate section 10 is equipped with set screws 15 for adjustable connection thereof with the sections 12 and also for allowing the centering of the light beneath the bedstead, the light being hereinafter fully described.

Built into the intermediate section 10 of the fixture is an electric bulb socket part 16 being accessible interiorly of this section 10 on removal of a cover plate 17 in association therewith. Separably fitting the socket 18 of the part 16 is an electric light bulb 19 of standard kind while adjustably fastened to the said part 16 is a shade 20 for the bulb 19 and such shade effects a reflector for the projecting of the light from the bulb 19 when lighted. The shade 20 at the open side 21 it fitted with a reticulated or wire mesh screen guard 22, which latter with the shade 20 encloses the light bulb 19 without shutting off the projecting of light therefrom and by reason of the open side 21 to this shade the light will be projected from the bulb 19 to opposite sides of the bed for illuminating purposes.

Within the outer sections 12 of the fixture are arranged switches C, being two in number, in association with the fixture applicable to the double bed and each switch is actuated through the application and release of pressure on and from the same by the mattress B for regulating current supply to the bulb 19 for the automatic lighting thereof. The current supply is had by the circuit layout illustrated in Figure 6 of the drawings and denoted generally at 23 which includes the switches and the bulb 19, the electric source of energy supply being had from a circuit lead 24 of a house electrical installation.

Each switch C comprises a contact-enclosing shell 25 preferably sectional and made from insulating material such as porcelain or other non-conducting material. The shell 25 has rising therefrom an insulating bonnet or crown 26 in which is fitted a slidable sleeve 27 carrying at and insulated from its lower end a movable contact 28. Within the shell 25 above and below the movable contact 28 are the pairs of terminal contacts 29 and 30, respectively, for the wires of the circuit assembly 23. Fitting the sleeve 27 is a socketed plunger 31 acted upon by a coiled expansion spring 32 confined within said sleeve 27 for projecting the said plunger 31 outwardly thereof. The sleeve 27 has surrounding it a compression spring 33 of greater tension than the tension of the spring 32 and being confined within the bonnet or crown 26. Adjustably fitted within the socket 34 of the plunger 31 is a stem 35 carrying a contact head 36, the stem 35 being adjustably held in the socket 34 by a set screw 37 fitting the plunger 31. The spring 33 normally holds the contact 28 engaged with the terminal contacts 29 and in this position of the switch C the light bulb 19 is extinguished, a flow of current being cut off therefrom in the circuit assembly 23. The spring 32 acting upon the plunger 31 raises the head 36 to have the same spaced beneath the mattress B a distance so that when a person occupying the bed and resting on such mattress the depressing of the plunger 31 due to the contact of the mattress with the head 36 on the stem 35 will not disturb the movable contact 28 from its normal position engageable with the contacts 29 and in this way illumination of the bulb 19 can not take place as a result of the restlessness of the occupants of the bed.

When the sleeve 27 under depression of the plunger 31 is caused to lower against the resistance of the spring 33 through weight of an occupant of the bed on entry thereto, the contact 28 is relieved from the contacts 29 and engaged with the contacts 30 of the switch C on that side of the bed entry is made thereto, the bulb 19 through such change or position of the contact 28 of the said switch will become illuminated or lighted. Now when full occupancy of the bed occurs by the entrance of a second occupant, the other switch C becomes active by pressure of the mattress B against the same due to the weight of the second occupant of the bed and thus current supply through the circuit 23 to the bulb 19 is shut off and thus the bulb extinguished. Should either occupant of the two occupying the bed leave the latter at either side thereof, the light bulb 19 becomes illuminated until this occupant reenters the bed when the said bulb becomes extinguished. Normally when the bed is unoccupied the light bulb 19 is extinguished and when the bed is partially occupied by one occupant, this light bulb 19 becomes illuminated or lighted and such bulb does not become extinguished until the other or full occupancy of the bed occurs. Thus the light is automatically operative, being illuminated by partial occupancy of the bed of the double type and extinguished on full occupancy thereof and in this manner manual control of the light is avoided.

The light of this automatic type is susceptible of service with twin beds or a pair of single beds, being only required that one switch C included in the circuit assembly 23 be associated with each of the single beds and thus on occupancy of either of the single beds the light will be illuminated and on occupancy of both of the single beds the light will be extinguished.

In Figure 1 of the drawings the switches C are located midway of the areas of the bed of the double type disposed on opposite sides of the longitudinal center of said bed so that such switches are individually controlled by partial occupancy of the bed for the lighting of the light and on full occupancy of said bed simultaneously operate for the extinguishing of said light. Now it is to be understood that when the bed is completely unoccupied or fully occupied the light remains extinguished. However, when partial occupancy occurs the light goes on or is illuminated. This illumination of the light will occur when partial occupancy of the bed takes place from either side thereof. It is of course understood that the current supply to the emergency light can be shut off by a suitable conventional hand switch (not shown) when it is desired that the double bed or the two twin beds be serviceable for only a single occupant of a room having these therein or that the emergency light not be used.

What is claimed is:

1. An electric light for a bed having a depressible support for occupancy, comprising means separably attachable to the bed beneath the support, an electric lamp carried by said means, an electric current supply for said lamp, and switches arranged in the current supply in the path of the support and operated by displacement of said support for the automatic lighting of said lamp when either of the switches is shifted in one direction by partial occupancy of said support and for the automatic extinguishing of said lamp when said switches are shifted in reverse direction on unoccupancy of the support.

2. The combination of an electrically lighted lamp, a current supply for said lamp, switches arranged in said supply and operating for the automatic lighting of said lamp when either of said switches is shifted in one direction and for the automatic extinguishing of said lamp when both said switches are shifted in either direction through application and release of extraneous force, and a fixture separably fitting the lamp to a bed for operative disposition of the switches beneath a mattress supported by the bed so that occupancy of either side of the bed only will light the lamp and occupancy of both sides of the bed or unoccupancy thereof will extinguish said lamp.

3. The combination of an electrically lighted lamp, a current supply for said lamp, switches arranged in said supply and operating for the automatic lighting of said lamp when either of said switches is shifted in one direction and for the automatic extinguishing of said lamp when both said switches are shifted in either direction through application and release of extraneous force, a fixture separably fitting the lamp to a bed for operative disposition of the switches beneath a mattress supported by the bed, and means for adjusting said fixture in accordance with the size of the bed so that occupancy of either side of the bed only will light the lamp and occupancy of both sides of the bed or unoccupancy thereof will extinguish said lamp.

4. The combination of an electrically lighted lamp, a current supply for said lamp, switches arranged in said supply and operating for the automatic lighting of said lamp when either of said switches is shifted in one direction and for the automatic extinguishing of said lamp when both said switches are shifted in either direction through application and release of extraneous force, a fixture separably fitting the lamp to a bed for operative disposition of the switches beneath a mattress supported by the bed so that occupancy of either side of the bed only will light the lamp and occupancy of both sides of the bed or unoccupancy thereof will extinguish said lamp, means for adjusting said fixture in accordance with the size of the bed, and an adjustable shade for said lamp.

OSCAR J. DAIGLE.